Patented Dec. 21, 1943

2,337,215

UNITED STATES PATENT OFFICE

2,337,215

PROCESS FOR HYDROLYZING TITANIUM COMPOUNDS

Foord Von Bichowsky, Wilmington, Del., assignor to E. I. du Pont de Nemours & Company, Wilmington, Del., a corporation of Delaware No Drawing. Application July 6, 1939, Serial No. 283,046

10 Claims. (Cl. 23—202)

This invention relates to the production of titanium compounds useful as pigments, and more particularly to an improved process for producing pigment substances from titanium containing liquors. More specifically, it relates to an improved hydrolysis process for precipitating titanium oxide from titanium salt solutions through the employment of a novel and distinctive type of seeding or nucleating material.

In the production of commercial quality titanium pigments from titanium salt solutions through hydrolysis, suitable nuclei or seed must be supplied to such solutions to initiate hydrolysis. Various types of processes for effecting such seeding have been proposed. To a certain extent, some have afforded successful operations in industrial application. However, certain disadvantages inherently exist in such processes. For instance, one requires use of titanium solutions at such concentration as to be only obtainable by evaporating such solution under substantially reduced pressures. As a result, an undesirably costly operation is required, which, from an economical standpoint, renders such process commercially unattractive. Another requires use of specially prepared calcium sulfate to assist the hydrolysis. This ingredient must be subsequently removed, and, as a consequence, costly, time-consuming washing operations are required. Others require use of expensive neutralizing agents, such as caustic soda, in effecting precipitation of the hydrous titanium oxide, after which aging or ripening of the precipitate is had and under specially controlled conditions. The seeds obtained are then added to the main body of the solution to which heat is applied to effect precipitation. Being soluble, these neutralizing agents dissolve as salts in the hydrolysis acid liquor and must be removed from such acid prior to recovery and reuse; thus, further expensive and time-consuming washing operations are had.

I have found that these and other disadvantages in prior processes for initiating titanium liquor hydrolysis through seeding may be effectively overcome, and it is accordingly among the objects of my invention to provide such a result. Specific and further particular objects of my invention include the provision of a novel process for effecting the hydrolysis of titanium salt solutions whereby relatively high and increased yields of titanium oxide result; the provision of a novel and highly effective type of nucleating agent for initiating said hydrolysis and one in which the presence of disadvantageous types of neutralizing agents is not required; as well as to provide convenient and useful methods for preparing such novel types of seeds. Other objects and advantages of the invention will be apparent from the ensuing description.

These and other objects are attainable in my invention which comprises effecting the hydrolysis of titanium liquor solutions by use of a relatively dry nucleating material containing as an essential ingredient a titanium oxy-halide compound.

In a more specific and preferred embodiment, the invention comprises initiating the hydrolysis of titanium salt solutions, such as the chloride, nitrate, or sulfate, through employment of a previously prepared titanium oxy-chloride nucleating material.

In one adaptation of the invention, I effect hydrolysis of relatively dilute or concentrated titanium solutions by initially preparing from the titanium solution, and through evaporation or otherwise, a relatively dry, powdered seeding material by mixing, preferably, anhydrous titanium chloride with relatively strong hydrochloric acid. Upon the initial addition of a portion of the anhydrous titanium tetrachloride, large volumes of hydrogen chloride become evolved and, as the addition progresses, the material turns through a liquid into a relatively voluminous, white or yellowish-white solid substance. I then subject the resultant voluminous powder to further drying and preferably in an atmosphere of air, and at a temperature between substantially 50 and 70° C. The material thus obtained is then ready for use as an efficient seeding agent in the hydrolysis of titanium salt solutions.

In a more specific and preferred embodiment, I first prepare a relatively concentrated titanium chloride solution, containing in excess of about 300 grams $TiO_2$ per liter, and an amount of hydrochloric acid equivalent to about 3 or 4 molecules of HCl per molecule of $TiO_2$. I then employ this solution in the preparation of a dry, powdered, white titanium oxy-chloride compound useful as a novel type of nucleating agent for hydrolysis, such solution being subjected to evaporation by passing a current of air or other non-reactive gaseous medium over the solution while the same is maintained at an elevated temperature, preferably substantially below the boiling point of the solution and within the range of, say, about 50 to 85° C. While temperatures such as those indicated are preferred, higher or lower temperatures may also be employed. In instances where higher temperatures are used, care must be exercised not to maintain the material under treatment for too long a period. Where lower temperatures are resorted to, it will be found desirable to hold the material at the lower temperature for longer periods of time so that its nucleating properties will become desirably and sufficiently developed. The conditions of nucleating agent preparation are obviously variable and readily determinable. The most effective and efficient seed material analyzes to substantially a ratio or composition of about 1 atom of chlorine per atom of titanium and about 5 or 6 mols of water per mol of titanium. Consequently, in procuring the most preferred type of agent, it will be found desirable and necessary to evaporate or dry the material until such composition results.

Previous to use, I preferably dissolve or suspend the dry, basic titanium chloride or oxychloride residue in water and obtain a colloidal solution. Thereafter, I add such solution to the titanium liquor to be hydrolyzed. Dissolution of the seed may be readily accomplished by employing, say, from about 2 to 5 parts by weight of water per weight of the titanium residue. When so prepared, the seeding agent is adapted to immediate use or may be withheld from use and stored for lengthy periods, since I have found that it does not lose its effectiveness even when withheld from use after preparation for periods of time up to a month or longer.

Preferably, the colloidal titanium solution is added to the titanium salt solution to be hydrolyzed substantially immediately prior to heating said solution to effect its hydrolysis. The amount of agent employable for the purpose may be conveniently varied and over a rather wide range. Usually, I prefer to employ an amount of seeding material ranging from not less than about .3% of the total titanium liquor to be hydrolyzed and up to about 5% or higher. Due to its effectiveness, only very minor quantities of agent need be used. When amounts ranging from about .75% to about 2% are utilized, it will be found that optimum benefits and advantages arise under the invention. This latter range therefore constitutes a preferred and most useful range in my invention. If amounts in excess of 5% are employed, it will be found that no additive or increased benefits accrue and consequently resort to such excess amounts need not ordinarily be had.

In order that the invention may be more clearly understood, the following illustrative examples are given, which are not to be considered as in limitation of its broad underlying concepts:

Example I

A concentrated solution of TiCl4 containing 390 grams TiO2 and 643 grams HCl was prepared by dissolving anhydrous TiCl4 in water. A portion of this solution was evaporated to dryness in a current of air while holding its temperature at 60° C. The residue was found to be only 55% the weight of the solution used for evaporation. This residue was dissolved in water using 3 parts by weight of the latter to 1 part by weight of the evaporated residue whereupon was obtained a cloudy colloidal solution. This was stored as a seed suspension to be used in hydrolyses. One of these hydrolyses was conducted by using 10 volumes of the above 390 grams per liter TiCl4 solution plus 25 volumes of water to which mixture was added 2 volumes of the seed suspension. The precipitation was effected by holding the temperature of the mixture at 95° C. for 30 minutes. The product was separated from the hydrochloric acid and calcined at 800° C. The product showed excellent color, tinting strength and hiding power. X-ray analysis revealed that it was a rutile pigment.

Example II

A seed material was prepared from anhydrous titanium tetrachloride and concentrated HCl by slow addition of the former to the latter, this addition being continued until a dry yellowish powder, free of all pasty liquid zones, was obtained. This dry material was then treated to remove further amounts of volatile matter (HCl and water) by holding the same at temperature of about 70° C. for one hour while passing a current of air over it. During this operation the chloride content was reduced and the material became more free flowing. It was then added to four times its weight of water. An opaque seed suspension was thereby obtained which was used in the hydrolysis of a titanium chloride solution. A quantity of this suspension containing five parts by weight of TiO2 was added to a concentrated titanium chloride solution equivalent to 95 parts by weight of TiO2 and the solution was adjusted in concentration to 105 grams per liter by dilution with dilute hydrochloric acid. The temperature was then elevated by external heating and maintained in excess of about 90° C. for 45 minutes. Analysis of the resulting solution showed that the hydrolysis yield was in excess of 97%, showing the excellent effectiveness of the seed material in inducing hydrolysis of titanium salt solutions. The titanium oxide was separated from the mother liquor, washed and calcined at a temperature of 975° C. to develop its pigment properties. On analysis, it was found to consist of a rutile pigment of excellent brightness, tinting strength and hiding power, its properties in these respects being superior to those which present titanium oxide of commerce exhibits. In hiding power alone, it was found to be about 19% better than commercial titanium oxide pigment.

My novel and preferred chloride type of dry seed material, on analysis, appears to be represented by the formula $Ti(OH)_3Cl.5H_2O$, and corresponds to about 1 gram atom of titanium for each gram atom of chlorine. This can be varied somewhat by the conditions of preparation, and accordingly products containing as little as 0.8 gram atom of chlorine per gram atom of titanium, and as much as 1.2 gram atoms of chlorine per gram atom of titanium, may likewise be usefully employed in my invention without incurring any inacceptable losses in effectiveness or potency of agent. While this oxychloride type of seed is preferred for use in the invention, other oxy-halides such as those of bromine and iodine may also be employed and obtained by evaporating or drying the corresponding titanium salt solution. Generically, therefore, my dry seed type of material may be represented by the formula $Ti(OH)_3X.5H_2O$, in which X represents chlorine, bromine or iodine. While bromide and iodide types of seeds may be used in the invention, due to their relative instability, I prefer, as indicated, to utilize the oxy-chloride type of seed.

While the above examples disclose the hydrolysis of titanium chloride solutions, the invention, as indicated, is not limited thereto. My novel seed suspensions are equally useful for the hydrolysis of other titanium salt solutions, such as those of the sulfate or nitrate. It has particular attractiveness and effectiveness in the hydrolysis of titanium chloride or nitrate solutions, since in such instances one is enabled to produce a rutile titanium oxide pigment of high quality, as judged from its improved color, hiding power and tinting strength. In respect to these important and necessary properties, it is at least equal to and usually exceeds the pigment properties which rutile produced by other hydrolytic precipitation processes exhibits. In instances where my novel seed material is employed in the hydrolysis of titanium sulfate solutions, such as those prepared by the interaction of sulfuric acid with a titanium ore, such as ilmenite, the hydrolysis product will be found to consist substantially of anatase, which will calcine to a good quality pigment. With chloride or nitrate solutions, my process will give a rutile precipitate, as illustrated in the above examples.

In the preferred embodiments of my invention, I prepare colloidal seed suspensions by adding the powdery basic titanium chloride to water, and while the latter is in cold or hot condition. This has definite advantages, both as regards effectiveness and ease of transfer of material from place to place in the plant. The potency of my agent will be found to be quite high under such conditions, and while I prefer to initially add the seed to a diluent, such as water, the same may be added, if desired, directly to the titanium solution to be hydrolyzed. In such instances, however, a small sacrifice in the effectiveness of my seeding agent may result but such an operation is to be considered as within the scope of my invention. Although water comprises a preferred type of diluent for use in my invention, other liquids or aqueous solutions may be used as a suspension medium for the seeding agent, and are to be considered as equivalents of water. Thus, in lieu of water, I may employ relatively dilute solutions containing titanium. Such dilute solutions may comprise, for example, the wash or other waters employed in the pigment producing process.

As has been indicated, the concentration of the titanium solution to be hydrolyzed by the novel seeding material of my invention is variable and over wide ranges, due to the great power of my nucleating agent. However, economical operating conditions require that relatively high concentrations be maintained and it is in the range of such higher concentrations that best results accrue from my process. Preferably, in chloride (or nitrate) hydrolyses, I prefer to hydrolyze while maintaining a $TiO_2$ concentration of from about 90 to 120 g./l.; while with sulfate solutions, higher concentration values are resorted to, the $TiO_2$ concentration ranging from between about 150 and 210 g. l., but preferably between 170 and 190 g./l. The time of hydrolysis will also vary with the concentration. With the more concentrated sulfate solutions, it will be found that a longer time will be required in effecting hydrolysis.

As is apparent from the above disclosure, I am able to produce a seed material without the necessity of resorting to neutralization of the acid-containing portion of the titanium solution used in preparation of the seed. In this one respect alone, my process is superior to prior procedures which require use of such materials. Accordingly, my process avoids the necessity of purchasing these expensive neutralizing reagents and the hydrolysis solutions which result from my invention will be found free of the salts which are necessarily present in said prior art seed suspensions. This freedom from dissolved salts enables one to more readily recover the hydrolysis acid. This is a decided and distinct advantage which renders my process readily adapted for use in the titanium pigment industry.

I claim as my invention:

1. A process for hydrolyzing a titanium salt solution which comprises concentrating a titanium-hydroxy halogen solution to relatively dry, solid condition to obtain a titanium-hydroxy halogen complex which in the dry state exhibits the formula $Ti(OH)_3xyH_2O$, wherein $x$ represents a member of the class consisting of chlorine, bromine or iodine and $y$ is at least 5, mixing the resulting concentrate with a titanium solution to be hydrolyzed, and then hydrolyzing the resulting mixture.

2. A process for hydrolyzing a titanium salt solution which comprises concentrating a titanium-hydroxy halogen solution to relatively dry, solid condition to obtain a titanium-hydroxy halogen complex which in the dry state exhibits the formula $Ti(OH)_3xyH_2O$, wherein $x$ represents a member of the class consisting of chlorine, bromine or iodine and $y$ is at least 5, suspending a small amount of the resulting concentrate in a diluent, mixing the resulting suspension with a titanium solution to be hydrolyzed, and then hydrolyzing the resulting mixture.

3. A process for hydrolyzing a titanium salt solution which comprises concentrating a titanium-hydroxy halogen solution to relatively dry, solid condition to obtain a titanium-hydroxy halogen complex which in the dry state exhibits the formula $Ti(OH)_3Cl.5H_2O$, mixing the resulting concentrate with a titanium solution to be hydrolyzed, and then hydrolyzing the resulting mixture.

4. A process for hydrolyzing a titanium salt solution which comprises dehydrating a solution containing a titanium-hydroxy halogen compound to reduce the same to relatively dry, powdered condition to obtain a titanium-hydroxy halogen complex which in the dry state has the formula $Ti(OH)_3xyH_2O$, wherein $x$ represents a member of the class consisting of chlorine, bromine or iodine and $y$ is at least 5, suspending the resulting concentrate in a diluent, mixing the resultant suspension with a titanium salt solution, and then hydrolyzing the resulting mixture at an elevated temperature.

5. A process for hydrolyzing a titanium salt solution which comprises dehydrating a titanium-hydroxy chloride solution to reduce the same to relatively dry, powdered condition to obtain a titanium-hydroxy halogen complex having the formula $Ti(OH)_3Cl.5H_2O$, suspending a small amount of the resulting concentrate in a diluent, mixing the resulting suspension with a hydrolyzable titanium salt solution, and then hydrolyzing the resulting mixture at an elevated temperature.

6. A process for hydrolyzing a titanium salt solution which comprises dehydrating a solution containing a titanium-hydroxy halogen compound to reduce the same to relatively dry condition to obtain a titanium-hydroxy halogen complex which in the dry state has the formula $Ti(OH)_3xyH_2O$, wherein $x$ represents a member of the class consisting of chlorine, bromine or iodine and $y$ is at least 5, incorporating from about .3 to about 5% of a colloidal solution of said concentrate in a titanium salt solution, and then hydrolyzing the resulting mixture at an elevated temperature.

7. A process for hydrolyzing a titanium salt solution which comprises dehydrating a solution containing a titanium-hydroxy chloride compound to reduce the same to relatively dry, solid condition to obtain a titanium complex which in the dry state has the formula $Ti(OH)_3Cl.5H_2O$, incorporating from about .75 to 2% of a colloidal solution of said concentrate in a titanium salt solution, and then hydrolyzing the resulting mixture at an elevated temperature.

8. A process for hydrolyzing a titanium chloride solution which comprises dehydrating a solution containing a titanium-hydroxy chloride compound to reduce the same to relatively dry, solid condition to obtain a titanium complex which in the dry state has the formula $Ti(OH)_3Cl.5H_2O$, adding from about .3 to 5% of a colloidal solution of said concentrate to a titanium chloride solution to be hydrolyzed, and then hydrolyzing the resulting mixture at an elevated temperature.

9. A process for hydrolyzing a titanium nitrate solution which comprises dehydrating a solution containing a titanium-hydroxy chloride compound to reduce the same to relatively dry, solid condition to obtain a titanium complex which in the dry state has the formula $Ti(OH)_3Cl.5H_2O$, adding from about .3 to 5% of a colloidal solution of said concentrate to a titanium nitrate solution to be hydrolyzed, and then hydrolyzing the resulting mixture at an elevated temperature.

10. A process for hydrolyzing a relatively concentrated titanium chloride solution containing in excess of about 300 g. per liter of $TiO_2$ which comprises concentrating a titanium-hydroxy chloride solution to relatively dry, powdered condition to obtain a titanium complex which in the dry state has the formula $Ti(OH)_3Cl.5H_2O$, mixing a small amount of the resulting concentrate while in colloidal suspension with said concentrated titanium chloride solution, and then subjecting the resulting mixture to hydrolysis.

FOORD VON BICHOWSKY.